United States Patent
Hartmann et al.

(10) Patent No.: US 6,935,822 B2
(45) Date of Patent: Aug. 30, 2005

(54) DETACHABLE FASTENER INCLUDING A SCREW ELEMENT AND A SECURING RING

(75) Inventors: Gunther Hartmann, Alsfeld (DE); Wolfgang Sommer, Gemünden (DE); Frank Wagner, Grossen Buseck (DE)

(73) Assignee: Kamax-Werke Rudolf Kellerman GmbH & Co. KG, Osterode am Harz (DE)

(*) Notice: Subject to any disclaimer, the term of this patent is extended or adjusted under 35 U.S.C. 154(b) by 50 days.

(21) Appl. No.: 10/360,022

(22) Filed: Feb. 6, 2003

(65) Prior Publication Data

US 2003/0152439 A1 Aug. 14, 2003

(30) Foreign Application Priority Data

Feb. 8, 2002 (DE) .......................................... 102 05 300

(51) Int. Cl.⁷ ................................................ F16B 39/24
(52) U.S. Cl. ....................................... 411/161; 411/149
(58) Field of Search ................................ 411/149, 150, 411/160, 161, 187, 188, 533, 136

(56) References Cited

U.S. PATENT DOCUMENTS

| | | | | |
|---|---|---|---|---|
| 1,622,581 A | * | 3/1927 | Gunkel | 411/138 |
| 1,923,647 A | * | 8/1933 | Vera | 411/188 |
| 2,641,293 A | * | 6/1953 | Earle | 411/136 |
| 3,263,727 A | | 8/1966 | Herpolsheimer | |
| 3,438,416 A | * | 4/1969 | Thurston | 411/134 |
| 5,474,409 A | | 12/1995 | Terry | |
| 5,967,724 A | | 10/1999 | Terry | |
| 6,517,301 B2 | * | 2/2003 | Hartmann et al. | 411/136 |

FOREIGN PATENT DOCUMENTS

| | | | |
|---|---|---|---|
| DE | 10034748 A1 | 2/2002 | F16B/39/24 |
| WO | WO 92/14939 | 9/1992 | F16B/39/282 |

* cited by examiner

*Primary Examiner*—William L. Miller
(74) *Attorney, Agent, or Firm*—Thomas, Kayden, Horstemeyer & Risley, LLP

(57) ABSTRACT

A detachable fastener includes a screw element and a securing ring. The screw element and the securing ring each include cooperating wedge-shaped surface tooth arrangements and two different pairs of stop surfaces. The wedge-shaped surface tooth arrangements face one another and form sliding surfaces sliding upon one another in a loosening direction of rotation resulting in an increase of the axial force. The first pair of stop surfaces transmits torque in a tightening direction of rotation. The second pair of stop surfaces transmits torque in a loosening direction of rotation. The stop surfaces are arranged with a clearance existing between one another such that the wedge-shaped surface tooth arrangements can slide upon one another without skipping.

18 Claims, 5 Drawing Sheets

DETACHABLE FASTENER INCLUDING A SCREW ELEMENT AND A SECURING RING

CROSS REFERENCE TO RELATED APPLICATIONS

This application claims priority to co-pending German Patent Application No. 102 05 300.6-12 entitled "Lösbares Verbindungselement für ein Bauteil mit einem Schraubteil und einem Sicherungsring", filed Feb. 8, 2002.

FIELD OF THE INVENTION

The present invention is generally directed to fasteners for interconnecting components. Especially, the fastener includes a screw element which may be designed as a wheel screw or a wheel nut to be used with motor vehicles. The fastener also includes a securing ring being associated with the screw element. Usually, the securing ring is captively connected to the screw element to simplify assembly of the fastener. The fastener may be designed such that the securing ring may be rotated with respect to the screw element, and such that it may be moved with respect to the screw element to a limited extent in a radial direction. The extent is defined by a clearance. However, the extent of the radial movement of the axes of the screw element and of the securing ring with respect to one another is limited to a comparatively small value as it may make sense to compensate hole spacing deviations of the holes of the wheel and/or of the hub of the vehicle to which the wheel is to be connected.

BACKGROUND OF THE INVENTION

A detachable fastener is known from U.S. Pat. No. 3,263,727. A first embodiment of the known fastener includes three elements, namely a screw and two spring washers being associated with the screw. In another embodiment of the known fastener, one of the spring washers is integrated into the screw. The other spring washer forms some sort of a securing element. The screw includes an engagement surface for a wrench, a threaded portion and a supporting surface to transmit an axial force onto the securing element. The securing element includes a counter supporting surface and a contact surface to transmit the axial force onto a component. The screw at its supporting surface facing the securing element includes a first wedge-shaped surface tooth arrangement, and the securing element at its counter supporting surface facing the screw includes a corresponding second wedge-shaped tooth arrangement. The wedge-shaped surface tooth arrangements form sliding surfaces sliding upon one another under an increase of the axial force in the fastener when rotating the screw with respect to the securing element in the loosening direction of rotation. In this way, a securing effect is attained. The angle of inclination of the sliding surfaces is greater than the angle of inclination of the thread of the threaded portion of the screw. The sliding surfaces being active in the loosening direction of rotation are interconnected by shoulders. These shoulders extend in the direction of the axes, and they serve to attain positive engagement in the tightening direction of rotation. The shoulders are designed such that the securing ring is commonly rotated with the screw when introducing torque into the screw in the tightening direction of rotation. When loosening or untightening the screw, the sliding surfaces of the wedge-shaped surface tooth arrangements skip and they move beyond one another, respectively, preferably without exceeding the yielding point of the material. Due to this skipping effect, there is substantial wear and tear at the wedge-shaped surface tooth arrangements such that it is not possible to reuse the known fastener.

Another detachable fastener for a wheel of a motor vehicle, meaning a wheel screw, is known from German Patent Application No. 100 34 748 A1 corresponding to U.S. Patent Application Ser. No. 2002/0015628 A1. The known wheel screw includes a screw element and a supporting ring which together form the fastener. The screw element includes an engagement surface for a wrench, a threaded portion and a supporting surface to transmit an axial force onto the securing element. The securing element includes a counter supporting surface and a contact surface to transmit the axial force onto a component. The screw at its supporting surface facing the securing element includes a first wedge-shaped surface tooth arrangement, and the securing element at its counter supporting surface facing the screw includes a corresponding second wedge-shaped tooth arrangement. The wedge-shaped surface tooth arrangements form sliding surfaces sliding upon one another under an increase of the axial force in the fastener when rotating the screw with respect to the securing element in the loosening direction of rotation. In this way, a securing effect is attained. The angle of inclination of the sliding surfaces is greater than the angle of inclination of the thread of the threaded portion of the screw. The sliding surfaces being active in the loosening direction of rotation are interconnected by shoulders. These shoulders extend in the direction of the axes, and they serve to attain positive engagement in the tightening direction of rotation. The shoulders are designed such that the securing ring is commonly rotated with the screw when introducing torque into the screw in the tightening direction of rotation. When loosening the screw element, there is the danger of the sliding surfaces of the wedge-shaped surface tooth arrangements skipping and moving beyond one another. This may result in plastic deformation and wear.

Another detachable fastener is known from PCT Application No. PCT/US92/00892 published as WO 92/14939 and corresponding to U.S. Pat. No. 5,190,423. The known fastener includes two components, namely a screw element and a securing ring. The screw element is designed as a nut, i.e. it does not include a shank. The screw element includes a first surface of engagement for a wrench, a threaded portion and a supporting surface to transmit an axial force onto the securing ring. The securing ring includes a second engagement surface for a wrench, a counter supporting surface and a contact surface to transmit the axial force onto the component. The screw element at its supporting surface facing the securing element includes a first wedge-shaped surface tooth arrangement, and the securing element at its counter supporting surface facing the screw includes a corresponding second wedge-shaped tooth arrangement. The wedge-shaped surface tooth arrangements form sliding surfaces sliding upon one another under an increase of the axial force in the fastener when rotating the screw with respect to the securing element in the loosening direction of rotation. In this way, a securing effect is attained. The angle of inclination of the sliding surfaces is greater than the angle of inclination of the thread of the threaded portion of the screw. The sliding surfaces being active in the loosening direction of rotation are interconnected by shoulders. These shoulders extend in the direction of the axes, and they serve to attain positive engagement in the tightening direction of rotation. The shoulders are designed such that the securing ring is commonly rotated with the screw when introducing torque into the screw in the tightening direction of rotation. Desired untightening of the known fastener is achieved by simultaneous uniform torque engagement at the two engagement surfaces for a wrench at the screw element and at the securing ring. This movement is somewhat difficult, and it does not necessarily result from the arrangement of the two engagement surfaces for a wrench. Usually, the two engagement surfaces for a wrench are not aligned before starting the untightening movement such that it is possible that the known fastener is not correctly loosened. In the case of starting an untightening movement only by applying torque to the screw element, the axial force in the screw element and in the securing ring will be increased when continuing the sliding movement or initiating the sliding movement for the first time such that the loosening process is aggravated. Consequently, skipping of the two wedge-shaped surface tooth arrangements cannot be prevented. Thus, wear and tear will occur at the wedge-shaped surface tooth arrangements, wear and tear having a negative influence on the possibility of reusing the fastener.

Usually, the two engagement surfaces to be engaged by a wrench will not be aligned when tightening the known fastener. Incorrect use of the known fastener may especially not be precluded when using common wrenches including a double division of the wrench surfaces for simplifying handling of the wrench. It is an advantage of these tools that half the angle of rotation compared to a conventional wrench is required to align the wrench on the surface of engagement of the screw. When using such a wrench with the known fastener, it is possible that the screw element and the supporting ring are being tightened in the wrong rotational relationship with respect to one another. The fastener will then automatically rotate back to reach the starting position being defined by the stop surfaces under operational loads. In this case, there will be undesired losses of pre-tension. Furthermore, only half the sliding path may be practically used compared to an orderly tightened joint including two correctly aligned engagement surfaces.

SUMMARY OF THE INVENTION

The present invention relates to a detachable fastener. The fastener includes a screw element including an engagement surface, a threaded portion, a supporting surface, a first wedge-shaped surface tooth arrangement being arranged at the supporting surface and first and second stop surfaces. The fastener also includes a securing ring being connected to the screw element, the securing ring including a counter supporting surface facing the supporting surface, a second wedge-shaped surface tooth arrangement being arranged at the counter supporting surface and first and second stop surfaces. The supporting surface is designed and arranged to transmit an axial force onto the securing ring. The first and second wedge-shaped surface tooth arrangements are designed and arranged to face one another and to form sliding surfaces sliding upon one another in a loosening direction of rotation resulting in an increase of the axial force. The at least one first stop surface of the screw element and the at least one first stop surface of the securing ring are designed and arranged to form at least one first pair of stop surfaces. The at least one first pair of stop surfaces is designed and arranged to transmit torque in a tightening direction of rotation. The at least one second stop surface of the screw element and the at least one second stop surface of the securing ring are designed and arranged to form at least one second pair of stop surfaces. The at least one second pair of stop surfaces is designed and arranged to transmit torque in a loosening direction of rotation. The stop surfaces of the at least one first and second pairs of stop surfaces are designed and arranged with a clearance between one another such that the first and second wedge-shaped surface tooth arrangements can slide upon one another without skipping.

The novel fastener provides a securing effect to the screw element in the loosening direction of rotation when forces being directed in the loosening direction of rotation during loads act upon the screw element. The detachable fastener includes a low number of elements, it may be easily and securely mounted and demounted, and it may be reused.

The present invention is based on the concept to improve detachable fasteners being designed as screws or nuts and including a supporting ring without increasing the number of elements. The use of a wedge-shaped surface tooth arrangement results in an increase of the axial force during unintentional loosening of the screw. This means that the wedge-shaped surface tooth arrangements counteract undesired loosening effects of the fastener when forces act upon the fastener. For example, transverse forces acting upon the elements of the fastener under certain load conditions lead to the wedge-shaped surface tooth arrangements sliding upon one another. This sliding movement results in an increase of the axial force and in the loosening movement being stopped. Consequently, further decrease of pre-tension is counteracted. Consequently, only a strongly limited relative movement takes place. Each tendency of a relative movement is counteracted. This effect will be attained for a plurality of times even under different loading conditions. These effects are attained during unintentional self loosening or untightening effects. In this way, losses of pre-tension are compensated. This especially applies when pre-tension has already been decreased by unpreventable setting effects, and when the portion of the transverse force to be transmitted by frictional engagement between the elements has also been decreased. Similar applies when the joint has not been tightened to the appropriate torque—for example by inappropriate assembly or maintenance—and the level of pre-tension required for a secure joint has not been reached. In this way, the novel fastener also improves safety of joints being realized with the novel fastener.

The novel fastener includes two pairs of stop surfaces being active between the screw element and the securing ring. One of the pairs of stop surfaces is designed and arranged to transmit torque in the tightening direction of rotation, and the other pair of stop surfaces is designed and arranged to transmit torque in the loosening direction of rotation. The pairs of stop surfaces are arranged with a clearance between one another. In other words, there is an effective distance or a rotation angle distance between the pairs of stop surfaces. The clearance is used to allow for sliding of the sliding surfaces of the wedge-shaped tooth arrangements upon one another without skipping of the wedge-shaped surface tooth arrangements. Skipping is to be understood herein as the movement of a first protrusion of the first tooth arrangement from a first impression of the second tooth arrangement beyond a first protrusion of the second tooth arrangement into a second impression of the second tooth arrangement. In this way, sliding is only possible to a limited extent, the sliding path in the circumferential direction being less than the division of the wedge-shaped surface tooth arrangements. To securely prevent the described undesired skipping movement, the novel fastener includes at least one pair of stop elements being effective in the tightening direction of rotation and at least one pair of stop surfaces being effective in the untightening direction of rotation.

The arrangement of the wedge-shaped surface tooth arrangements and of the pairs of stop surfaces with respect to one another is chosen such that the pair of stop surfaces being effective in the tightening direction of rotation defines the relative position of the sliding surfaces of the wedge-shaped surface tooth arrangements in the maximum approached rotational position between the screw element and the securing ring. In this way, there is no sliding friction between the sliding surfaces of the wedge-shaped surface tooth arrangements during tightening of the fastener. The maximum usable sliding path is defined thereby. The pair of stop surfaces being effective in the loosening direction of rotation becomes effective no earlier than when a part of the sliding path and its projection, respectively, has been exceeded.

This effect is attained by torsional engagement at the one and only engagement surface for a wrench in the loosening direction of rotation. Due to the fact that the novel fastener only includes one engagement surface for a wrench, it will always be correctly operated during tightening and also during untightening.

Due to the fact that the first wedge-shaped surface tooth arrangement is located at the screw element—meaning, for example, a screw, a wheel screw or a wheel nut—and that the second wedge-shaped surface tooth arrangement is located at the securing ring, the total number of elements of the novel fastener is not increased. Additionally, the number of gaps in the joint where setting effects may occur does not differ compared to known fasteners. Consequently, setting effects will not be increased compared to the prior art.

The first and second wedge-shaped surface tooth arrangements are designed and arranged such that there will be a securing effect when forces act upon the screw element in the loosening direction of rotation. The securing effect will secure the connection between the screw element, the securing ring and the component being joint by the fastener. Unintentional, self loosening effects will be prevented under an increase of the axial force resulting in the screw element and the securing ring being rotated against each other to a limited extent. On the other hand, when the screw element is intentionally tightened or loosened the respective pair of stop surfaces will positively engage to commonly rotate the screw element and the securing ring. The limited movement in two opposite axial directions during unintentional loosening effects takes place within the projection of a sliding surface.

There is a number of possibilities for realizing the pairs of stop surfaces. For example, the pairs of stop surfaces may be designed as a claw clutch or as a spline shaft tooth arrangement. However, different designs are also possible. The number of wedge-shaped surfaces of the wedge-shaped surface tooth arrangements and the number of pairs of stop surfaces may be identical, different or even very different. It is preferred when the wedge-shaped surfaces are uniformly distributed about the circumference. The pairs of stop surfaces do not have to be uniformly distributed about the circumference.

There is the possibility of securing the engaging position between the screw element and the securing ring by arranging the securing ring at the screw element in a captive way and in a way to be rotatable corresponding to the clearance. The clutch element and the tooth arrangement, respectively, is always located in the engaging position. In this way, the starting position of the screw element with respect to the securing ring is determined. When tightening the fastener the sliding surfaces initially slide upon one another such that the screw element and the securing ring approach one another in an axial direction to attain the closest position. In this way, the beginning of the sliding path is determined and reached, respectively. When the sliding path being formed by the wedge-shaped surface tooth arrangements begins directly at the pair of stop surfaces being effective in the tightening direction of rotation, the sliding path is used in an optimum way. During untightening of the fastener, the sliding surfaces at the screw element and at the securing ring also slide upon one another without the danger of skipping effects. It is also possible that the shoulders form the pair of stop surfaces being effective in the tightening direction of rotation, and that contact during tightening is realized at this place. In this case, it makes sense to chose the clearance existing between the pairs of stop surfaces to be identical, too, or to be greater than the projection of the wedge-shaped surface tooth arrangements, and to arrange the pairs of stop surfaces with respect to the wedge-shaped surface tooth arrangements such that the clearance is located outside of the projection of a wedge-shaped surface. This arrangement allows for the possibility of limiting and reducing, respectively, the actual sliding path. At the same time, it is possible to accept greater tolerances at the pair of stop surfaces not actually being active in the tightening sense of direction.

The sliding surfaces of the wedge-shaped surface tooth arrangements may be designed as plain surfaces. However, it is preferred that the surfaces are designed to be non-planar form surfaces, and that the effective pitch of the form surfaces of the tooth arrangement getting in contact in the loosening direction of rotation is slightly greater than the pitch of the threaded portion. The non-planar form surfaces may be designed in a thread-like way to always provide surface contact. The form surfaces may also be designed to be non-planar in a way that their angle of inclination varies about the sliding path.

The pairs of stop surfaces and the wedge-shaped surface tooth arrangements being located at the supporting surface of the screw element and at the counter supporting surface of the securing ring may be uniformly distributed about the circumference. This arrangement is especially preferred. The wedge surfaces of the wedge-shaped surface tooth arrangements may be arranged at the bottom of impressions being located in the screw element or at the bottom of impressions being located at the securing ring. The pairs of stop surfaces and the wedge-shaped surface tooth arrangements may be arranged in a circumferential direction in an alternating way one after the other with or without radial offset.

The wedge-shaped surface tooth arrangements are located on surfaces extending in a radial direction with respect to the axis of the fastener. The stop surfaces of the pairs of stop surfaces may either be located in regions of the supporting surface and of the counter supporting surface or in axially extending regions of the screw element and of the securing ring. In this way, for example, surfaces extending in a radial direction with respect to the axis of the fastener may be entirely and exclusively used for the arrangement of the wedge-shaped surface tooth arrangements.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
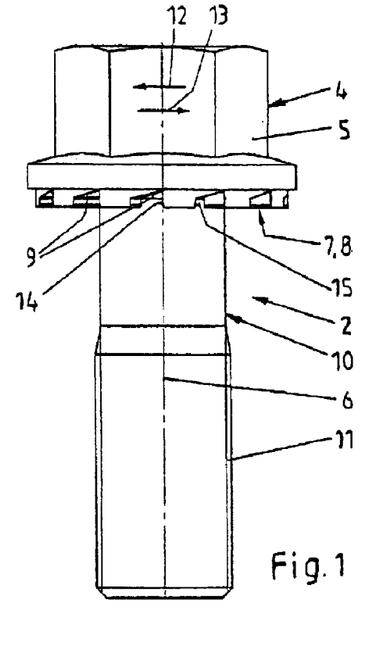
FIG. 1 is a side view of a first exemplary embodiment of the novel screw element.
Figure 2:
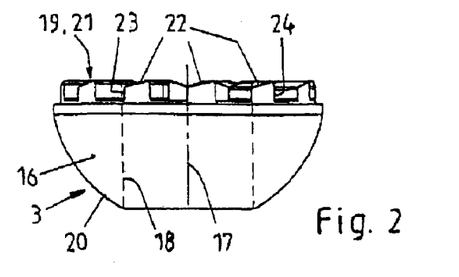
FIG. 2 is a side view of a first exemplary embodiment of a securing ring being associated with the screw element according to FIG. 1.
Figure 3:
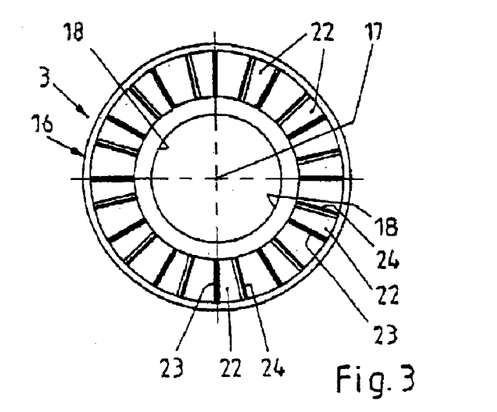
FIG. 3 is a top view of the securing ring according to FIG. 2.

Referring now in greater detail to the drawings, FIGS. 1–5 illustrate a first exemplary embodiment of the novel fastener 1. The fastener 1 includes at least two components, meaning a screw element 2 (FIG. 1) and a securing ring 3 (FIGS. 2 and 3). The screw element 2 illustrated in FIG. 1 generally is designed as a screw, but it may also be designed as a nut. It is to be understood that the term screw element herein is not limited to a screw, but it may also designate a nut. The screw element 2 includes a head 4 including a surface of engagement 5 for a wrench. The screw element 2 includes an axis 6. A supporting surface 7 is located at the bottom side of the head 4. The screw element 2 with the supporting surface 7 contacts the securing ring 3 to transmit an axial force of the screw element 2 onto the securing ring 3 and further onto a component (not illustrated) to be joint by the fastener 1.

A first wedge-shaped tooth surface arrangement 8 is located in the region of the supporting surface 7. The wedge-shaped surface tooth arrangement 8 includes wedge-shaped surfaces 9 being located in impressions. The wedge-shaped surfaces 9 are designed as surfaces being inclined in the illustrated way, and to be continuous along the supporting surface 7 in a radial direction with respect to the axis 6. The inclination angle of these wedge-shaped surfaces 9 is also coordinated with the direction of rotation of the screw element 2. The screw element 2 includes a shank 10 having a threaded portion 11. When the screw element 2 is designed as a screw, in which the thread of the threaded portion 11 is arranged at such a direction of rotation as it is generally the case, the screw element 2 may be tightened by a clockwise rotational movement, meaning a movement in the tightening direction of rotation 12. The opposite direction of rotation, meaning the loosening direction of rotation 13, then serves to loosen and unscrew, respectively, the screw element 2 with respect to the component (not illustrated).

The supporting surface 7 does not only include the wedge-shaped surfaces 9 of the wedge-shaped tooth arrangement 8, but also two additional stop surfaces 14 and 15. The stop surface 14 is associated with the tightening direction of rotation 12, and it fulfills its function during tightening of the screw element 2. The stop surface 15 is associated with the loosening direction of rotation 13, and it fulfills its function when loosening or unscrewing the screw element 2. The wedge-shaped surfaces 9 and the supporting surfaces 14 and 15 are uniformly distributed about the circumference of the supporting surface 7 in the illustrated way. The supporting surface 7 includes a corresponding number of wedge-shaped surfaces 9, stop surfaces 14 and stop surfaces 15.

Figure 4:
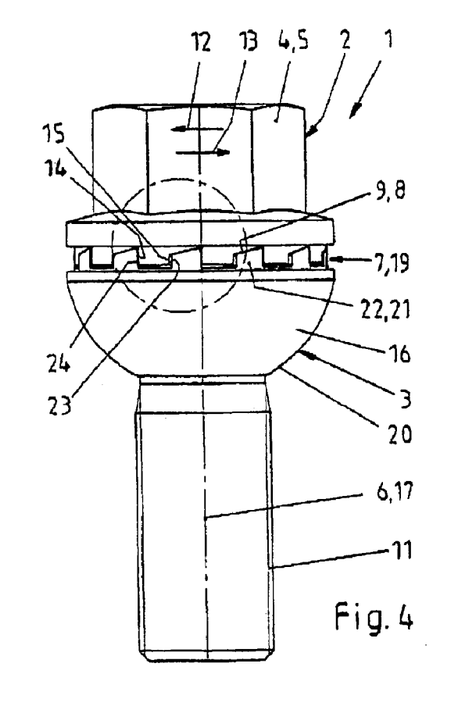
FIG. 4 is a side view of a first exemplary embodiment of the novel fastener including the screw element and the securing ring.

The securing ring 3 being associated with the screw element 2 according to FIG. 1 is illustrated in FIGS. 2 and 3. The securing ring 3 is designed as an annular body 16 having a design generally similar to a washer. However, for special applications the securing ring 3 may also have a special design. The annular body 16 includes an axis 17 and a bore 18 being continuous in the direction of the axis 17. The diameter of the bore 18 is coordinated with the outer diameter of the threaded portion 11 in a way that the securing ring 3 may be located on the shank 10 of the screw element 2. The final position is illustrated in FIG. 4.

The securing ring 3 includes a counter supporting surface 19 corresponding to the supporting surface 7 of the screw element. At the other side—meaning the side facing the component (not illustrated)—the body 16 of the securing ring 3 includes a contact surface 20. In the illustrated embodiment, the contact surface 20 has a spherical shape. Consequently, the securing ring also fulfills a centering function. The securing ring has a typical design, and the fastener 1 especially serves as a wheel bolt or a wheel screw for connecting wheels to motor vehicles.

The counter supporting surface 19 includes a second wedge-shaped surface tooth arrangement 21 including wedge-shaped surfaces 22. The surfaces 22 are located at protrusions, and they protrude in an axial direction towards the supporting surface 7. The inclination angle of the arrangement of the wedge-shaped surfaces 22 corresponds to and is associated with, respectively, the inclination angle of the wedge-shaped surfaces 9. The counter supporting surface 19 includes stop surfaces 23 and 24 being associated with the stop surfaces 14 and 15 of the screw element 2. In this way, there is a first pair of supporting surfaces 14, 24 being designed and arranged to contact one another when rotating the screw element 2 in the tightening direction of rotation 12. Correspondingly, there is a second pair of stop surfaces 15, 23 being associated with the loosening direction of rotation 13. When tightening the screw element 2, the securing ring 3 is positively engaged by the pair of stop elements 14, 24, and it is also rotated in the tightening direction of rotation 12. When loosening or unscrewing the screw element 2, the securing ring 3 is positively engaged by the screw element 2, and it is commonly rotated therewith in the loosening direction of rotation 13. The stop surfaces of the two pairs of stop surfaces 14, 24 and 15, 23 are designed and arranged such that the wedge-shaped surfaces 9 and 22 may be moved to a limited extent. This is achieved by clearance existing between the screw element 2 and the securing ring 3 in the direction of rotation, as this is especially illustrated in FIG. 5. The screw element 2 may be rotated with respect to the securing ring 3 by a limited angle. During this rotational movement, the wedge-shaped surface 9 contacts the wedge-shaped surface 22, and it slides thereon. Thus, the pairs of stop surfaces are designed and arranged such that there may be a sliding movement. The projection of the path of the sliding movement onto a circumferential surface perpendicular with respect to the axis 6 corresponds to a certain rotational angle between the screw element 2 and the securing ring 3. During this sliding movement, the screw element 2 is tensioned in an axial direction, meaning there is an increase of the axial force. For this purpose, the angle of inclination of the wedge-shaped surfaces 9, 22 is greater than the angle of inclination of the thread of the threaded portion 11. Since this sliding movement occurs between the pairs of stop surfaces 14, 24 and 15, 23, the projection of the path of the sliding movement into the circumferential surface corresponds to the clearance existing between the pairs of stop surfaces.

The exemplary embodiment of the novel fastener 1 illustrated in FIGS. 1–5 is preferred. It may be produced in a comparatively easy way. It is possible to realize essential production steps by cold forming. In this embodiment of the novel fastener 1—as also in all other exemplary embodiments of the novel fastener 1—it is important to realize that the axial extension of the impressions and the protrusions, respectively, at which the wedge-shaped surfaces 9 and 22 and the stop surfaces 14, 15, 23 and 24 are located are illustrated in an exaggerated way concerning size and length, respectively.

Figure 5:
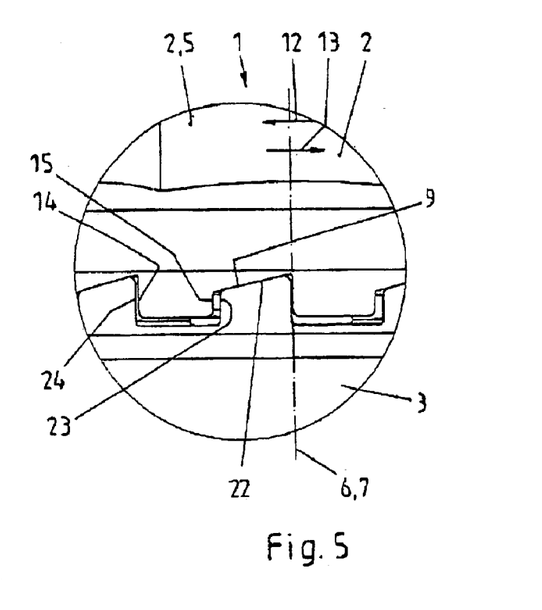
FIG. 5 is a detailed view of a part of FIG. 4.

When using the embodiment of the fastener 1 as illustrated in FIGS. 1–5, the securing ring 3 is inserted over the shank 10 of the screw element 2, and the screw element 2 with the thread of the threaded portion 11 is screwed into the component. In the beginning, the screw element 2 and the securing ring 3 are located in a relative position as it is illustrated in FIG. 5. During the tightening movement—meaning before or after placing the supporting surface 20 on the component—the screw element 2 will rotate with respect to the securing ring 3 in the tightening direction of rotation 12 until the supporting surface 14 contacts the supporting surface 24. When rotating the screw element 2, the securing ring 3 is positively engaged, and it is commonly rotated about its axis 17. The tightening movement of the fastener 1 will be finished when the required axial force with which the fastener 1 is to be tightened has been reached.

However, due to loads and force engagements acting upon the screw element 2 and/or the securing ring 3, there may be a relative rotational movement between the screw element 2 and the securing ring 3 in the loosening direction of rotation 13. During this movement, the wedge-shaped surfaces 9 slide upon the wedge-shaped surfaces 22, and the desired securing effect by increasing the axial force is attained. The relative movement occurring between the screw element 2 and the securing ring 3 in the loosening direction of rotation 13 will then be terminated. It is to be understood that the wedge-shaped surface 9 only slides upon the wedge-shaped surface 22 along a comparatively small path. It is possible to realize a relative position between the screw element 2 and the securing ring 3 as illustrated in FIG. 5.

During intentional untightening of the fastener 1, torque acting in the loosening direction of rotation 13 is applied to the surface of engagement 5 for a wrench. As a result, there is a number of different relative movements between the screw element 2 and the securing ring 3. It is possible that the sliding movement is continued, and a further increased axial force makes it more difficult to untighten the fastener 1. When untightening the fastener 1, the threaded portion 11 will rotate within the component resulting in a decrease of the axial force. During this untightening movement of the fastener 1, there will be a relative position between the screw element 2 and the securing ring 3 in which the stop surface 15 of the screw element 2 contacts the stop surface 23 of the securing ring 3. As soon as this position has been reached, the securing ring 3 is positively engaged by the screw element 2, and it is commonly rotated therewith in the loosening direction of rotation 13 until the screw element 2 has been unscrewed from the component. It is to be understood that skipping effects or effects during which the tooth-like protrusions of the wedge-shaped surfaces 9 and 22 are moved beyond one another are prevented. This makes it possible to reuse the fastener 1 for being screwed into another component or into the same component one more time. It is especially advantageous when the securing ring 3 is captively arranged on the screw element 2 by the threaded portion 11.

Figures 6, 7, 8:
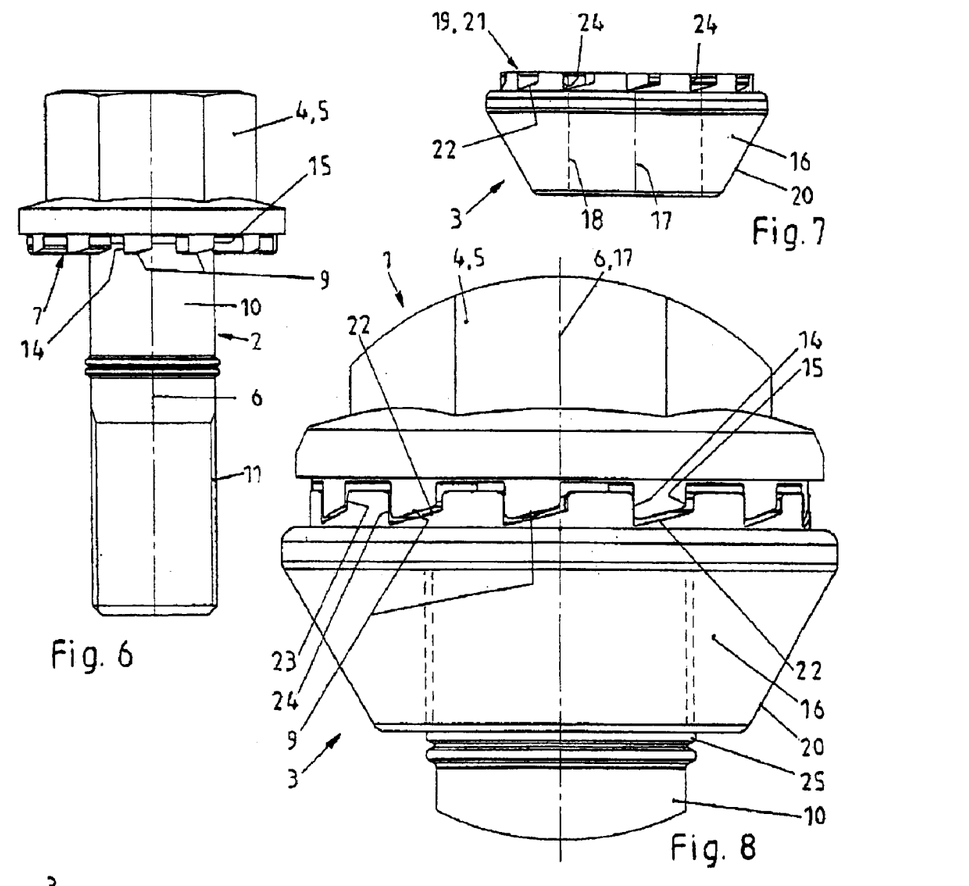
FIG. 6 is a side view of a second exemplary embodiment of the novel screw element.
FIG. 7 is a side view of a second exemplary embodiment of the novel securing ring being associated with the screw element according to FIG. 6.
FIG. 8 is an enlarged sectional view of the novel fastener including the screw element of FIG. 6 and the securing ring according to FIG. 7.

FIGS. 6–8 illustrate a second exemplary embodiment of the novel fastener 1 in which the screw element 2 and the securing ring 3 generally have a similar design as it has been described with respect to FIGS. 1–5. Consequently, it is referred to the description with respect to the exemplary embodiment of the novel fastener illustrated in FIGS. 1–5. In addition to the common features, there also are some differences. The wedge-shaped surfaces 9 of the first wedge-shaped tooth arrangement 8 of the screw element 2 are located in the region of axial protrusions being located at the supporting surface 7 of the screw element 2, whereas, on the other hand, the wedge-shaped surfaces 22 of the second wedge-shaped tooth arrangement 22 of the securing ring 3 are located at the base of impressions. The relative arrangement of the wedge-shaped surfaces 9 and 22 is opposite to the exemplary embodiment of FIGS. 1–5. However, the angle of inclination and the relative position with respect to the direction of rotation corresponds to the exemplary embodiment of FIGS. 1–5.

Furthermore, the securing ring 3 includes a supporting surface 20 having a cone-like design.

The securing ring 3 is captively connected to the screw element 2. This means that it may only be moved with respect to the screw element 2 in an axial direction and about a respective rotational angle to a limited extent. For this purpose, the securing ring 3 according to FIG. 7 after its complete production is connected to the screw element 2. In the following, a protrusion 25 may be produced by rolling in the region of the shank 10 of the screw element 2. The outer diameter of the protrusion 25 after rolling is greater than the diameter of the bore 18 of the securing ring 3. The axial clearance remaining between the supporting surface 7 and the counter supporting surface 19 is less than the axial overlap of the stop surfaces 14, 15, 23, 24 and the wedge-shaped surfaces 9 and 22. The supporting surfaces 14, 24 and 15, 23 commonly form some sort of a claw connection such that the meshing position of this claw connection or claw clutch is attained and also secured by the protrusion 25 when pushing the securing ring 3 onto the screw element 2. FIG. 8 illustrates the remaining possible movements. Tightening and loosening the fastener is realized in the same way as it has already been described with respect to the exemplary embodiment of FIGS. 1–5.

Figure 9:
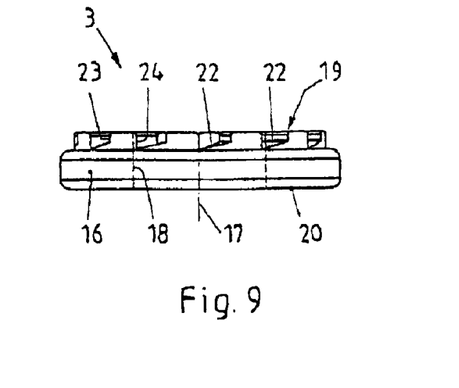
FIG. 9 is a view of another exemplary embodiment of the novel securing ring.

FIG. 9 illustrates a third exemplary embodiment of the novel securing ring 3. In this case, the securing ring 3 includes a flat disc-like body 16. The counter supporting surface 19 has the same design as it has been described with respect to the embodiment according to FIG. 7. Thus, a screw element 2 according to FIG. 6 corresponds to the securing ring 3. Of course, there is the possibility of arranging the securing ring 3 at the component 2 in a captive way.

Figure 10:
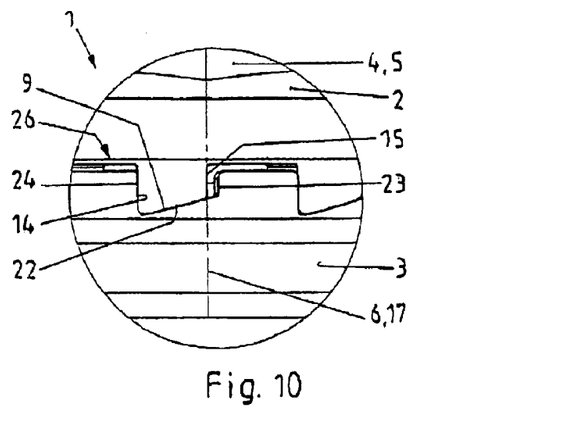
FIG. 10 is an enlarged detailed view of a screw element similar to FIG. 6 in combination with the securing ring according to FIG. 9.

FIG. 10 illustrates a relative position between the screw element 2 and the securing ring 3 as it is attained when tightening the screw element 2 and when having reached the final position. Again, protrusions and impressions being located in the region of the supporting surface 7 and the counter supporting surface 19 engage one another in the way of a claw clutch 26.

Figures 11, 12, 13, 14, 15:
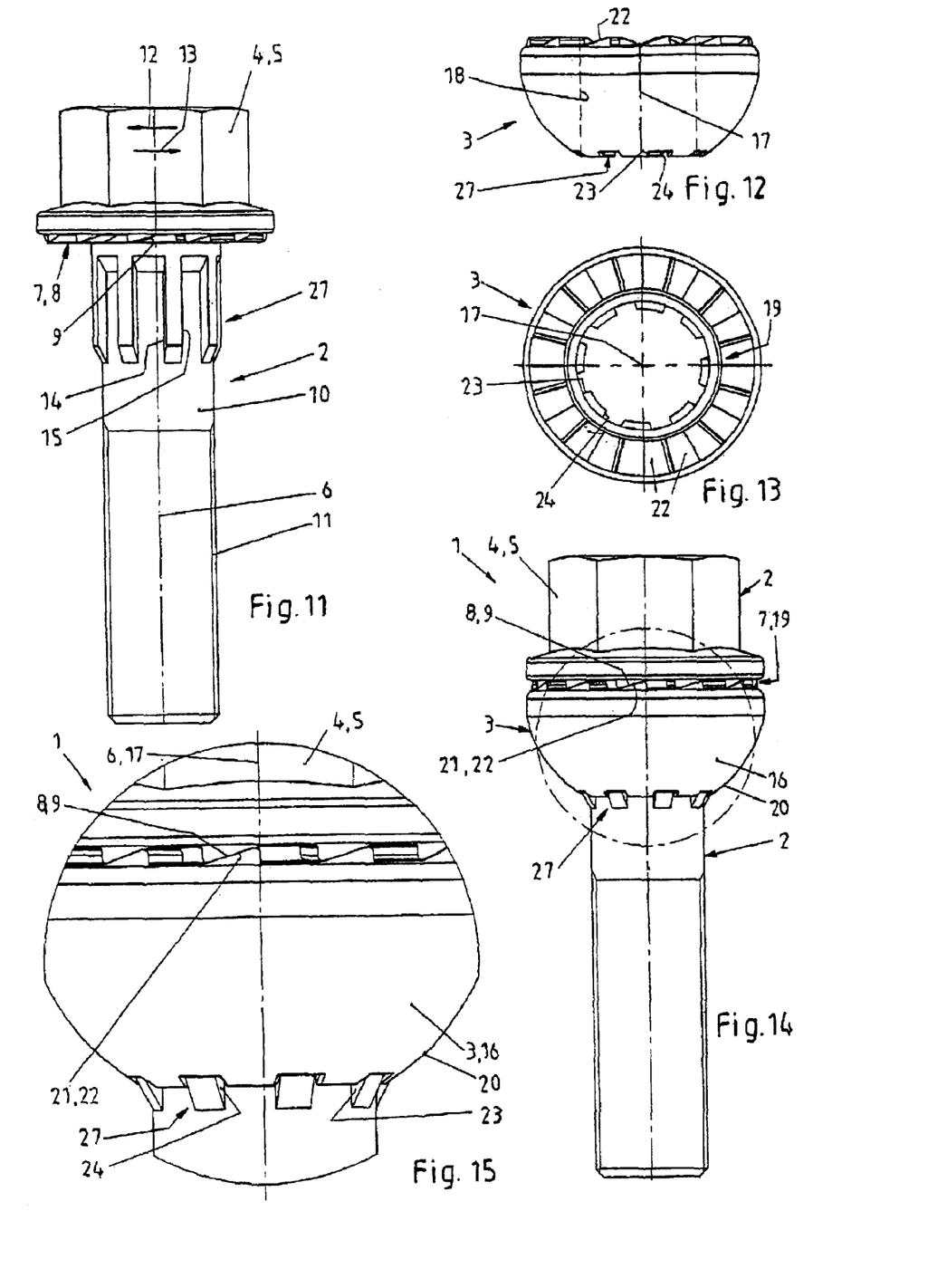
FIG. 11 is a side view of another exemplary embodiment of the novel screw element.
FIG. 12 is a side view of another exemplary embodiment of the novel securing ring.
FIG. 13 is a top view of the securing ring according to FIG. 12.
FIG. 14 is a side view of the screw element according to FIG. 11 and of the securing ring according to FIG. 12.
FIG. 15 is an enlarged detailed view of the fastener according to FIG. 14.

In the above described exemplary embodiments of the novel fastener 1 according to FIGS. 1–10, the wedge-shaped surfaces 9 and 22, respectively, have been located in the region of the supporting surface 7 and of the counter supporting surface 19, respectively. Due to the fact that the wedge-shaped surfaces 9, 22 serve to attain a securing effect by axial pre-tensioning during unintentional loosening effects, the wedge-shaped surfaces 9 and 22 are located in the region of the supporting surfaces 7 and 19, meaning in portions being located approximately perpendicular with respect to the axes 6, 17. In the exemplary embodiments of FIGS. 1–10, the pairs of stop surfaces 14, 24 and 15, 23 are also located in the region of the supporting surface 7 and of the counter supporting surface 19, respectively. However, it is not necessary to chose such an arrangement. FIGS. 11–15 illustrate another exemplary embodiment of the novel fastener 1 in which the fastener 1 does not include the above described claw clutch 26, but instead a spline shaft tooth arrangement 27. While the wedge-shaped surfaces 9 of the first wedge-shaped tooth arrangement 8 are located at the screw element in the region of the supporting surface 7, the spline shaft tooth arrangement 27 is located in the region of the shank 10 of the screw element 2. The spline shaft tooth arrangement 27 at the screw element 2 includes the stop surfaces 14 and 15 (FIG. 11). Correspondingly, the stop surfaces 23 in the region of the spline shaft tooth arrangement 27 are located at the securing ring 3 in the region of the bore 18, meaning in a region extending in an axial direction. This arrangement provides for the advantage of the wedge-shaped tooth arrangements 8 and 21 being spaced apart and being separately producible at the screw element 2 and at the securing ring 3. It is to be understood that the relative position has to be coordinated. The coordinated relative position is chosen such that the wedge-shaped tooth arrangements 8, 21 do not skip or move beyond one another since the sliding path is limited by the pair of stop elements 14, 24 and 15, 23.

Generally, there is the possibility of designing the wedge-shaped surfaces 9 and 22 as thread-like form surfaces to reduce surface pressure. However, it is also possible to design the wedge-shaped surfaces 9 and/or 22 as convex or concave form surfaces to realize a varying pitch, and to attain different pre-tensioning effects at different places.

Figure 16:
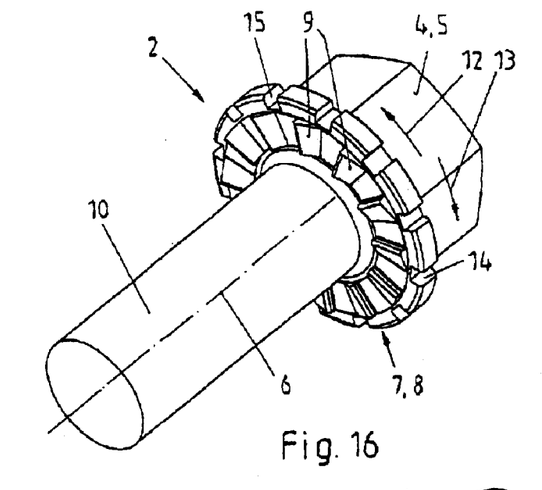
FIG. 16 is an isometric view of another exemplary embodiment of the novel screw element.
Figure 17:
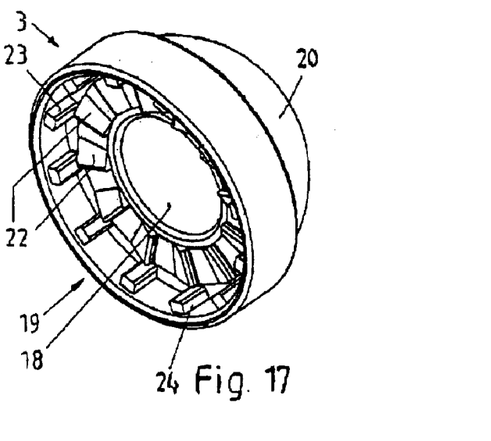
FIG. 17 is an isometric view of the securing ring being associated with the screw element according to FIG. 16.
Figure 18:
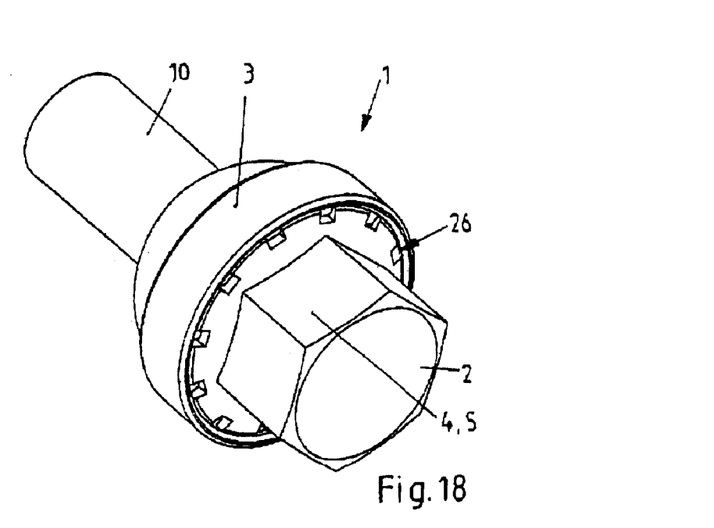
FIG. 18 is an isometric view of the screw element according to FIG. 16 and of the securing ring according to FIG. 17 in the assembled position.

FIGS. 16–18 are isometric illustrations of another exemplary embodiment of the fastener 1 including the screw element 2 and the securing ring 3. While the pairs of stop surfaces 14, 24 and 15, 23 in the exemplary embodiments of FIGS. 1–10 are alternately arranged one after the other in a tangential direction—meaning in the circumferential direction of the supporting surface 7 and the counter supporting surface 19, the exemplary embodiment of the novel fastener 1 according to FIGS. 16–18 is different. FIG. 16 illustrates the screw element without illustrating the threaded portion at the shank 10 for reasons of simplifying the illustration. The wedge-shaped surfaces 9 are arranged on a first annular section of the supporting surface 7, while the stop surfaces 14 and 15 are located on another annular section having a comparatively greater radius. This means that the two elements are spaced apart in a radial direction. The pairs of stop surfaces 14, 24 and 15, 23 again form a claw clutch 26. The wedge-shaped surfaces 9 and 22 sliding upon one another are arranged as it has already been described above. It is to be understood that it is also possible to realize a captive support of the securing ring at the screw element in this exemplary embodiment of the novel fastener 1.

Figure 19:
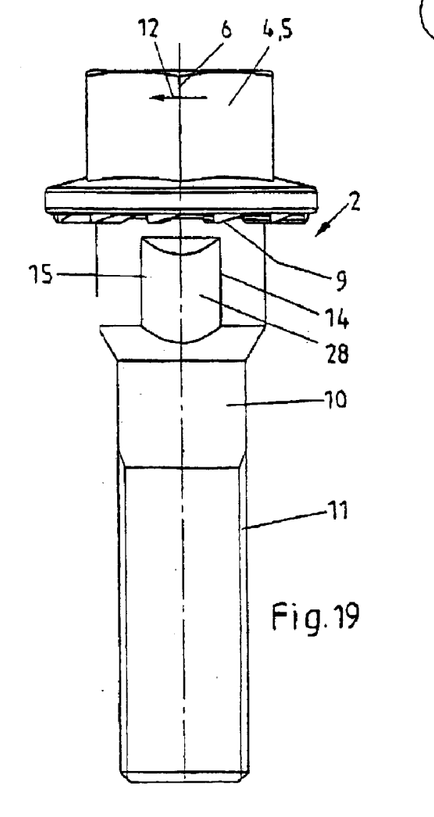
FIG. 19 is a side view of another exemplary embodiment of the novel screw element.
Figure 20:
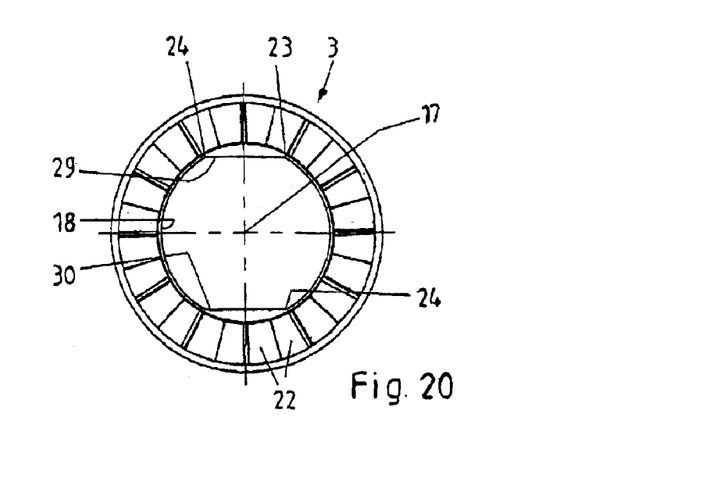
FIG. 20 is a top view of a novel securing ring being associated with the screw element according to FIG. 19.

The exemplary embodiment of the novel fastener according to FIGS. 19 and 20 generally corresponds to the exemplary embodiments according to FIGS. 6–15, meaning the pairs of stop surfaces are also located in axial portions to be spaced apart from the wedge-shaped surfaces 9 and 22. It is to be seen from FIG. 19 that two flattened portions 28 are located at the screw element 2 in the portion of the shank 10 in a spaced apart manner about the circumference. FIG. 19 shows two corresponding protrusions 29 and 30 being located in the region of the bore 18 of the securing ring 3 to protrude in a radial inward direction. The edges and the respective surface portions, respectively, form the stop surfaces 14 and 15 at the screw element 2 and 23 and 24 at the securing ring 3. Again, the relative position has to be chosen such that skipping or a movement of the wedge-shaped surfaces 9 beyond and with respect to the wedge-shaped surfaces 22 is prevented.

Figure 21:
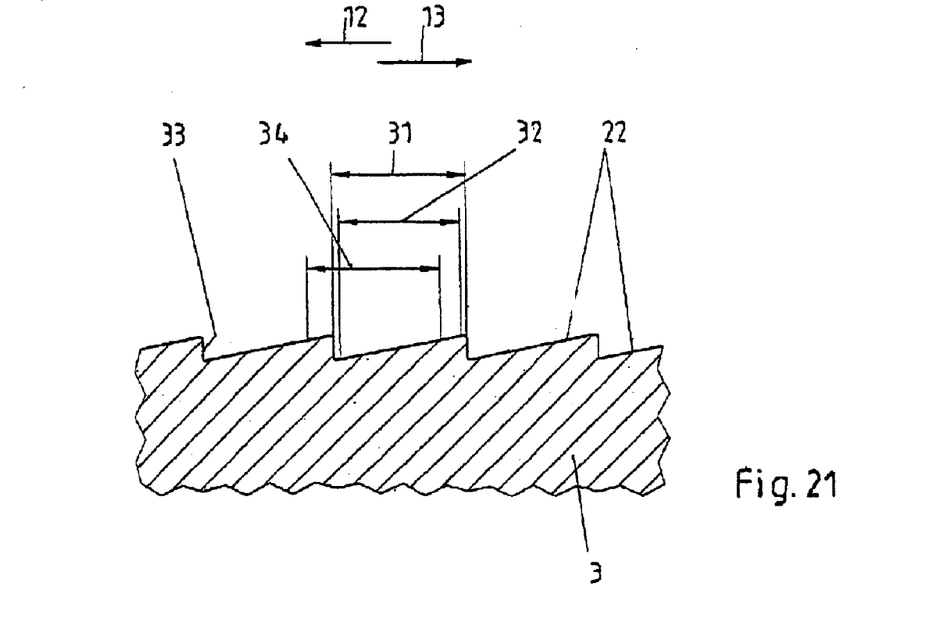
FIG. 21 is a layout view of the securing ring illustrating the principle position of the clearance of the claw connection.

FIG. 1 again generally illustrates the relative position of the clearance of the positively engaging clutch, especially of the claw clutch 26 between the screw element 2 and the securing ring 3. FIG. 21 illustrates a layout plan of the securing ring 3 showing the relative position of its wedge-shaped surfaces 22. The relative position of the tightening direction of rotation 12 of the screw element 2 and of its loosening direction of rotation 13 are indicated. The clearance 31 corresponds to the projection of the wedge-shaped surface 22 onto the counter supporting surface 19, and it thus extends in the circumferential direction from the beginning of the wedge-shaped surface 22 to its end. The clearance existing in the claw clutch 26 has to be less than the illustrated clearance 31 since skipping effects of the wedge-shaped surfaces 9 with respect to the wedge-shaped surfaces 22 would occur if this was not the case. A second clearance 32 is illustrated, the clearance 32 emphasizing an advantageous position of the clearance of the claw clutch 26 with respect to the extension of the wedge-shaped surfaces 22. It is to be seen from the Figure that the clearance 32 is less than the clearance 31, and that there is a distance with respect to both end points of the clearance 31. In this way, it is ensured that the shoulders 33 being arranged between the wedge-shaped surfaces 22 do not have an effect, and that they may be produced and arranged with a comparatively great allowable tolerance. In many cases, it is possible and useful to design and arrange the clearance 32 substantially smaller than the clearance 31. Tightening of the novel fastener 1 and loosening or untightening the novel fastener 1 are exclusively realized by positive engagement occurring at the claw clutch and at the pairs of stop surfaces 14, 24 and 15, 23.

FIG. 21 illustrates another clearance 34 serving to emphasize a theoretically possible relative position. In this relative arrangement, tightening—meaning positive engagement and common movement of the securing ring 3—is realized by the screw element 2 by means of the shoulders 33. The shoulders 33 fulfill the function of the pair of stop elements 14, 24. When loosening the fastener 1, the claw clutch 26 with its pair of stop surfaces 15, 23 fulfills the positive contact and the common movement of the securing ring 3 in the tightening direction of rotation 13. The possible relative rotational movement occurring between the screw element 2 and the securing ring 3 is less than the clearance 34.

Figure 22:
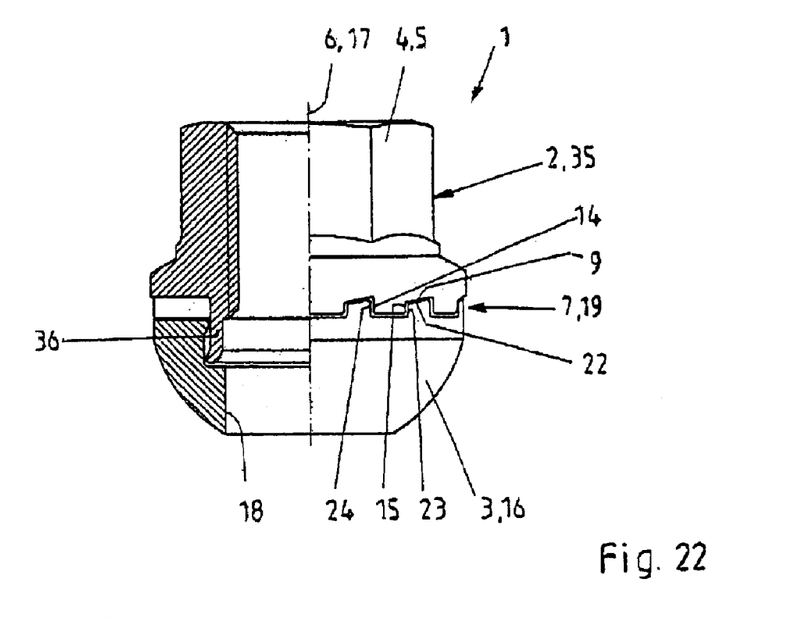
FIG. 22 is a partly sectional view of a fastener including a nut and a securing ring.

FIG. 22 illustrates the application of the present invention in the case of a fastener in which the screw element 2 is designed as a nut 35. The nut 35 includes the supporting surface 7 with the wedge-shaped surfaces 9, while the securing ring 3 includes the wedge-shaped surfaces 22. There also are the pairs of contact surfaces 14, 24 and 15, 23. The nut 35 includes a collar 36 with which the securing ring 3 is captively connected to the nut 35.

Figure 23:
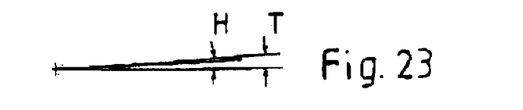
FIG. 23 is a schematic view showing the pitch of the surfaces of the wedge-shaped surface tooth arrangement and the pitch of the threaded portion.

FIG. 23 is a schematic view showing the feature of the pitch or tangential angle "T" of the shaped surface of the wedge-shaped surface tooth arrangement being slightly greater than the pitch or helix angle "H" of the threaded portion.

Many variations and modifications may be made to the preferred embodiments of the invention without departing substantially from the spirit and principles of the invention. All such modifications and variations are intended to be included herein within the scope of the present invention, as defined by the following claims.

We claim:

1. A detachable fastener, comprising:
    a screw element including an engagement surface, a threaded portion, a supporting surface, a first wedge-shaped surface tooth arrangement being arranged at said supporting surface and first and second stop surfaces, said stop surfaces being designed not to be resilient;
    a securing ring being connected to said screw element, said securing ring including a counter supporting surface facing said supporting surface, a second wedge-shaped surface tooth arrangement being arranged at said counter supporting surface and first and second stop surfaces, said stop surfaces being designed not to be resilient;
        said supporting surface being designed and arranged to transmit an axial force onto said securing ring;
        said first and second wedge-shaped surface tooth arrangements being designed and arranged to face one another and to form sliding surfaces sliding upon one another along a sliding path in a loosening direction of rotation resulting in an increase of the axial force;
        said at least one first stop surface of said screw element and said at least one first stop surface of said securing ring being designed and arranged to form at least one first pair of stop surfaces, said at least one first pair of stop surfaces being designed not to be resilient and being designed and arranged to transmit torque in a tightening direction of rotation, said at least one first pair of stop surfaces being deigned and arranged to allow for movement of said sliding surfaces along the entire sliding path and to prevent movement of said sliding surfaces beyond the sliding path in the tightening direction of rotation;
        said at least one second stop surface of said screw element and said at least one second stop surface of said securing ring being designed and arranged to form at least one second pair of stop surfaces, said at least one second pair of stop surfaces being deigned not to be resilient and being designed and arranged to transmit torque in a loosening direction of rotation, said at least one second pair of stop surfaces being deigned and arranged to allow for movement of said sliding surfaces along the entire sliding path and to prevent movement of said sliding surfaces beyond the sliding path in the loosening direction of rotation;
        said stop surfaces of said at least one first and second pairs of stop surfaces being designed and arranged with a clearance between one another such that said first and second wedge-shaped surface tooth arrangements can slide upon one another without skipping.

2. The fastener of claim 1, wherein said first and second wedge-shaped surface tooth arrangements are designed and arranged such that there is a securing effect counteracting undesired loosening of said fastener when forces act upon said screw element in the loosening direction of rotation, said screw element and said securing ring being rotated with respect to one another to a limited extent by said first and second wedge-shaped surface tooth arrangements under an increase of the axial force.

3. The fastener of claim 2, wherein said first stop surface of said screw element and said first stop surface of said securing ring are designed and arranged to positively engage one another when tightening said screw element, and wherein said second stop surface of said screw element and said second stop surface of said securing ring are designed and arranged to positively engage when loosening said screw element.

4. The fastener of claim 3, wherein said first and second pairs of stop surfaces are designed as a claw clutch.

5. The fastener of claim 3, wherein said first and second pairs of stop surfaces are designed as a spline shaft tooth arrangement.

6. The fastener of claim 3, wherein said securing ring is captively connected to said screw element in a way to limit an axial movement of said screw element and said securing ring with respect to one another to prevent skipping of said first and second wedge-shaped surface tooth arrangements with respect to one another.

7. The fastener of claim 3, wherein said first and second wedge-shaped surface tooth arrangements each include a number of wedge-shaped uneven form surfaces having an effective pitch and being designed and arranged to contact one another in the loosening direction of rotation, wherein said threaded portion has a pitch, and wherein the effective pitch of said form surfaces is slightly greater than the pitch of said threaded portion.

8. The fastener of claim 2, wherein said securing ring is captively connected to said screw element in a way to limit an axial movement of said screw element and said securing ring with respect to one another to prevent skipping of said first and second wedge-shaped surface tooth arrangements with respect to one another.

9. The fastener of claim 2, wherein said first and second wedge-shaped surface tooth arrangements each include a number of wedge-shaped uneven form surfaces having an effective pitch and being designed and arranged to contact one another in the loosening direction of rotation, wherein said threaded portion has a pitch, and wherein the effective pitch of said form surfaces is slightly greater than the pitch of said threaded portion.

10. The fastener of claim 1, wherein said securing ring is captively connected to said screw element in a way to limit an axial movement of said screw element and said securing ring with respect to one another to prevent skipping of said first and second wedge-shaped surface tooth arrangements with respect to one another.

11. The fastener of claim 1, wherein the clearance existing between said first stop surfaces of said first pair of stop surfaces and between said second stop surfaces of said second pair of stop surfaces substantially equals than a projection of said first and second wedge-shaped surface tooth arrangements, and wherein said first and second pairs of stop surfaces are arranged with respect to said wedge-shaped surface tooth arrangements such that the clearance is located outside of the projection of one of said wedge-shaped surfaces.

12. The fastener of claim 1, wherein said first and second wedge-shaped surface tooth arrangements each include a number of wedge-shaped uneven form surfaces having an effective pitch and being designed and arranged to contact one another in the loosening direction of rotation, wherein said threaded portion has a pitch, and wherein the effective pitch of said form surfaces is slightly greater than the pitch of said threaded portion.

13. The fastener of claim 1, wherein said first and second stop surfaces of said screw element are arranged at said supporting surface, and wherein said first and second stop surfaces of said securing ring are arranged at said counter supporting surface.

14. The fastener of claim 1, wherein said first and second stop surfaces of said screw element are arranged at portions of said screw element extending in an axial direction, and wherein said first and second stop surfaces of said securing ring are arranged at portions of said securing ring extending in an axial direction.

15. The fastener of claim 1, wherein said first and second pairs of stop surfaces and said first and second wedge-shaped surface tooth arrangements are arranged at said supporting surface and at said counter supporting surface in a uniformly spaced apart manner about the circumference.

16. The fastener of claim 1, wherein said screw element further includes a supporting surface being designed and arranged to transmit an axial force onto a component in a mounted position of said fastener.

17. The fastener of claim 1, wherein said screw element is designed as a screw.

18. The fastener of claim 1, wherein said screw element is designed as a nut.

\* \* \* \* \*